US010681093B2

(12) United States Patent
Tsai et al.

(10) Patent No.: US 10,681,093 B2
(45) Date of Patent: *Jun. 9, 2020

(54) APPARATUSES AND METHODS FOR COORDINATING COMMUNICATION OPERATIONS ASSOCIATED WITH A PLURALITY OF SUBSCRIBER IDENTITY CARDS IN A MOBILE COMMUNICATION DEVICE WITH A SINGLE WIRELESS TRANSCEIVER

(71) Applicant: MEDIATEK INC., Hsinchu (TW)

(72) Inventors: Chih-Yuan Tsai, New Taipei (TW); Chi-Chen Lee, Taipei (TW); Te-Huang Liu, Zhubei (TW); Chin-Han Wang, Taipei (TW); Yu-Tien Yeh, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,170

(22) Filed: Dec. 9, 2019

(65) Prior Publication Data

US 2020/0112593 A1 Apr. 9, 2020

Related U.S. Application Data

(63) Continuation of application No. 15/333,029, filed on Oct. 24, 2016.
(Continued)

(51) Int. Cl.
*H04M 1/66* (2006.01)
*H04L 29/06* (2006.01)
(Continued)

(52) U.S. Cl.
CPC ...... *H04L 65/1073* (2013.01); *H04L 63/0272* (2013.01); *H04L 65/1016* (2013.01);
(Continued)

(58) Field of Classification Search
CPC ...... H04W 36/14; H04W 48/18; H04W 88/06
See application file for complete search history.

(56) References Cited

U.S. PATENT DOCUMENTS 9,258,755 B1 2/2016 Ramamurthy et al.
9,661,674 B2 5/2017 Su
(Continued)

FOREIGN PATENT DOCUMENTS

EP 2 656 562 A2 10/2013
WO 2013/082245 A1 6/2013

*Primary Examiner* — Shantell L Heiber
(74) *Attorney, Agent, or Firm* — McClure, Qualey & Rodack, LLP

(57) ABSTRACT

A mobile communication device including a wireless transceiver and a wireless transceiver is provided. The wireless transceiver performs wireless transmission and reception to and from a first service network and a second service network. The controller uses a first subscriber identity card to establish one or more first radio bearers with the first service network via the wireless transceiver, uses a second subscriber identity card to set up an Internet Protocol Security (IPsec) tunnel with an evolved Packet Data Gateway (ePDG) of the second service network via the first radio bearers, and uses the second subscriber identity card to register an IP Multimedia Subsystem (IMS) service with the second service network via the IPsec tunnel.

20 Claims, 12 Drawing Sheets

Related U.S. Application Data

(60) Provisional application No. 62/246,229, filed on Oct. 26, 2015.

(51) Int. Cl.
*H04W 48/04* (2009.01)
*H04W 8/18* (2009.01)
*H04W 76/16* (2018.01)
*H04W 12/02* (2009.01)

(52) U.S. Cl.
CPC ......... *H04L 65/1069* (2013.01); *H04W 8/183* (2013.01); *H04W 12/02* (2013.01); *H04W 48/04* (2013.01); *H04W 76/16* (2018.02); *H04L 63/164* (2013.01)

(56) References Cited

U.S. PATENT DOCUMENTS

| | | |
|---|---|---|
| 10,291,529 B2 | 5/2019 | Dahod et al. |
| 2012/0250509 A1 | 10/2012 | Leung et al. |
| 2012/0258704 A1 | 10/2012 | Kim et al. |
| 2014/0169299 A1 | 6/2014 | Wang et al. |
| 2014/0321328 A1* | 10/2014 | Zuniga ............ H04W 8/06 370/254 |
| 2015/0181470 A1 | 6/2015 | Chai et al. |
| 2015/0296415 A1 | 10/2015 | Ling et al. |
| 2015/0304506 A1 | 10/2015 | Zhu et al. |
| 2016/0345256 A1 | 11/2016 | Niranjan |
| 2017/0034744 A1 | 2/2017 | Kwok et al. |
| 2017/0171902 A1 | 6/2017 | Tillman et al. |
| 2017/0280379 A1 | 9/2017 | Axmon et al. |
| 2018/0092140 A1 | 3/2018 | Dong et al. |

\* cited by examiner

APPARATUSES AND METHODS FOR COORDINATING COMMUNICATION OPERATIONS ASSOCIATED WITH A PLURALITY OF SUBSCRIBER IDENTITY CARDS IN A MOBILE COMMUNICATION DEVICE WITH A SINGLE WIRELESS TRANSCEIVER

CROSS REFERENCE TO RELATED APPLICATIONS

This Application is a Continuation of U.S. patent application Ser. No. 15/333,029, filed on Oct. 24, 2016, now U.S. Pat. No. 10,567,447, which claims priority of U.S. Provisional Application No. 62/246,229, filed on Oct. 26, 2015, the entirety of which is incorporated by reference herein.

BACKGROUND OF THE APPLICATION

Field of the Application

The application generally relates to wireless communications, and more particularly, to the coordination of communication operations associated with a plurality of subscriber identity cards for a mobile communication device with a single wireless transceiver.

Description of the Related Art

With growing demand for ubiquitous computing and networking, various wireless technologies have been developed, such as the Global System for Mobile communications (GSM) technology, General Packet Radio Service (GPRS) technology, Enhanced Data rates for Global Evolution (EDGE) technology, Universal Mobile Telecommunications System (UMTS) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and others. Generally, a cellular phone only supports one wireless technology and provides users with the flexibility of wireless communications at all times via the supported wireless technology, regardless of the user's geographic location. Especially in today's business world, cellular phones have become necessities for conducting business anytime and anywhere. Some people may find having an additional cellular phone is a good way to save money by controlling their budget for wireless service (including phone services and/or data services) charges. However, having two or more cellular phones may be troublesome, since one has to carry all these cellular phones and switch frequently between the cellular phones for different purposes.

In order to provide a convenient way of having multiple subscriber numbers, dual-card or multiple-card cellular phones have been developed, which generally have two or more wireless communication modules for respective wireless transmission and reception with an individual subscriber number. The dual-card or multiple-card design allows the wireless communication modules to be active simultaneously and allows calls to be received on either subscriber number associated with one of the wireless communication modules at any time. However, keeping these wireless communication modules active simultaneously may not be ideal for power consumption.

Moreover, for most dual-card or multiple-card cellular phones, the wireless communication modules therein operate independently. In such circumstances, if one wireless communication module cannot find an available service network for the corresponding subscriber number, it will remain active but unable to obtain any wireless service, and incoming calls for the subscriber number will be missed.

Therefore, it is desirable to have a more robust way of managing the communication operations between the wireless communication modules for multiple subscriber identity cards.

BRIEF SUMMARY OF THE APPLICATION

In one aspect of the application, a mobile communication device comprising a wireless transceiver and a controller is provided. The wireless transceiver is configured to perform wireless transmission and reception to and from a first service network and a second service network. The controller is configured to use a first subscriber identity card to establish one or more first radio bearers with the first service network via the wireless transceiver, use a second subscriber identity card to set up an Internet Protocol Security (IPsec) tunnel with an evolved Packet Data Gateway (ePDG) of the second service network via the first radio bearers, and use the second subscriber identity card to register an IP Multimedia Subsystem (IMS) service with the second service network via the IPsec tunnel.

In another aspect of the application, a method for coordinating communication operations associated with a plurality of subscriber identity cards in a mobile communication device with a single wireless transceiver is provided. The method comprises the steps of: using a first subscriber identity card to establish one or more first radio bearers with the first service network via the single wireless transceiver; using a second subscriber identity card to set up an IPsec tunnel with an ePDG of the second service network via the first radio bearers; and using the second subscriber identity card to register an IMS service with the second service network via the first radio bearers.

Other aspects and features of the present application will become apparent to those with ordinarily skill in the art upon review of the following descriptions of specific embodiments of the mobile communication devices and the methods for coordinating communication operations associated with a plurality of subscriber identity cards.

BRIEF DESCRIPTION OF DRAWINGS

The invention can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

Figure 1:
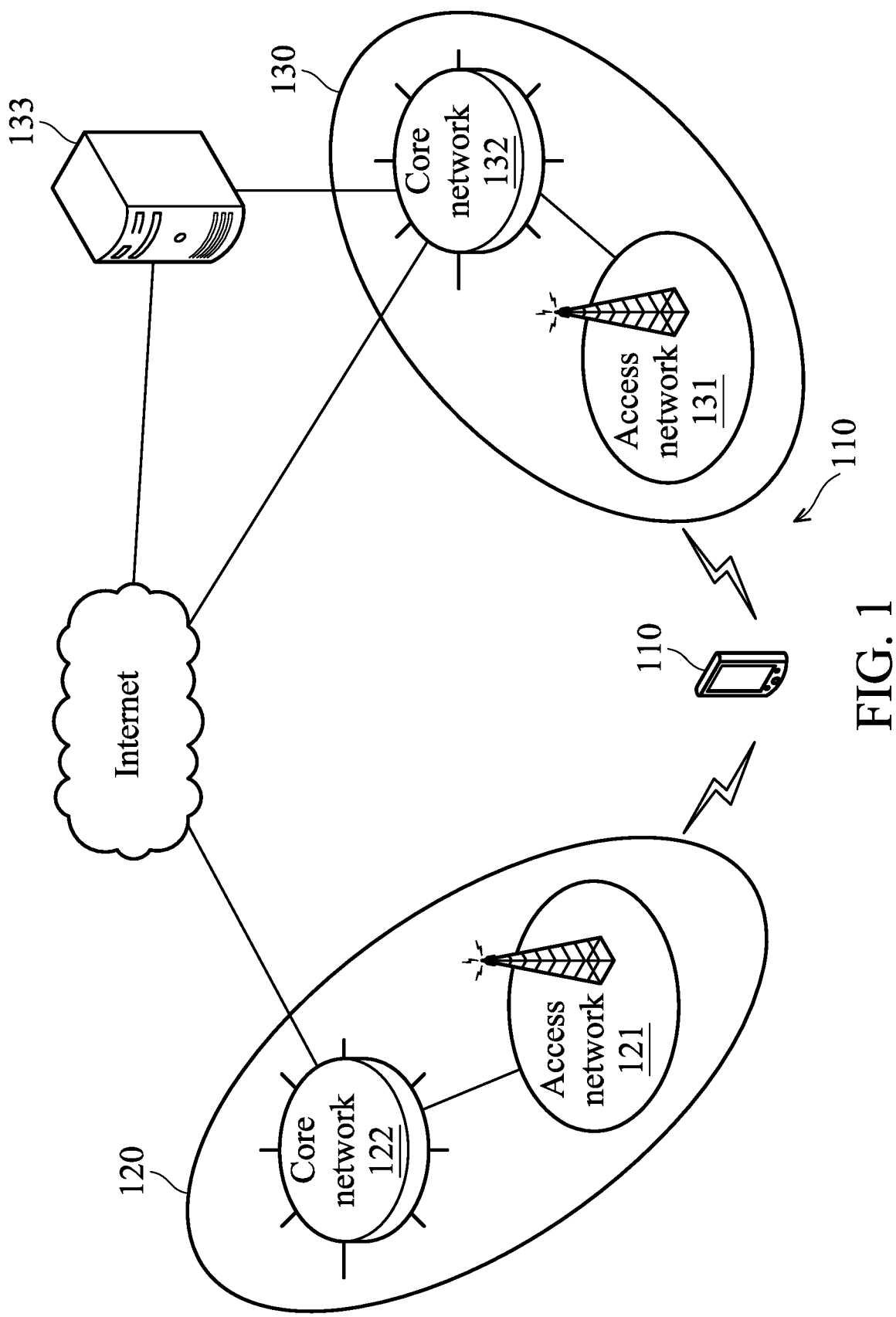
FIG. 1 is a block diagram of a wireless communication environment according to an embodiment of the application.

FIG. 1 is a block diagram of a wireless communication environment according to an embodiment of the application. The wireless communication environment 100 includes a mobile communication device 110, two service networks 120 and 130, and an evolved Packet Data Gateway (ePDG) 140, wherein the mobile communication device 110 may wirelessly communicate with the service networks 120 and 130 for obtaining wireless services using two separate subscriber numbers, and the ePDG 140 enables secure connection between the mobile communication device 110 and the core network 132 over an untrusted non-3GPP access (e.g., WiFi access).

The mobile communication device 110 may be referred to as User Equipment (UE) or Mobile Station (MS), such as a feature phone, a smartphone, a panel Personal Computer (PC), a laptop computer, or any computing device supporting the wireless technologies utilized by the service networks 120 and 130. Alternatively, a computer host or a notebook may connect/couple to the mobile communication device 110 and wirelessly access Internet resources therethrough.

The service network 120 may be a GSM/GPRS/EDGE, WCDMA, CDMA 2000, TD-SCDMA, WiMAX, LTE, LTE-A, or TD-LTE system, while the service network 130 is an LTE/LTE-A/TD-LTE system. Specifically, the service network 120 comprises an access network 121 and a core network 122, while the service network 130 comprises an access network 131 and a core network 132. Each of the access networks 121 and 131 is responsible for processing radio signals, terminating radio protocols, and connecting the mobile communication device 110 with the core network 122 or 132, while each of the core networks 122 and 132 is responsible for performing mobility management, network-side authentication, and interfaces with public/external networks (e.g., the Internet).

The access network 121 or 131 and the core network 122 or 132 may each include one or more network nodes for carrying out said functions. For example, if the service network 120 is a GSM/GPRS/EDGE system, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), Home Location Register (HLR), Serving GPRS Support Node (SGSN), and Gateway GPRS Support Node (GGSN). If the service network 120 is a WCDMA system, the access network 121 may be a Universal Terrestrial Radio Access Network (UTRAN) and the core network 122 may be a General Packet Radio Service (GPRS) core which includes a Home Location Register (HLR), at least one Serving GPRS Support Node (SGSN), and at least one Gateway GPRS Support Node (GGSN). If the service network 120 or 130 is an LTE/LTE-A/TD-LTE system, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

The subscriber numbers may be provided by two separate subscriber identity cards in compliance with the standards of the wireless technologies employed by the service networks 120 and 130. For example, if the service network 120 or 130 is a GSM/GPRS/EDGE system, one subscriber identity card may be a Subscriber Identity Module (SIM) card. If the service network 120 or 130 is a WCDMA, LTE, LTE-A, or TD-LTE system, the other subscriber identity card may be a Universal SIM (USIM) card. Specifically, the subscriber identity card used for communications with the service network 130 is a USIM card which supports the ePDG service.

Figure 2:
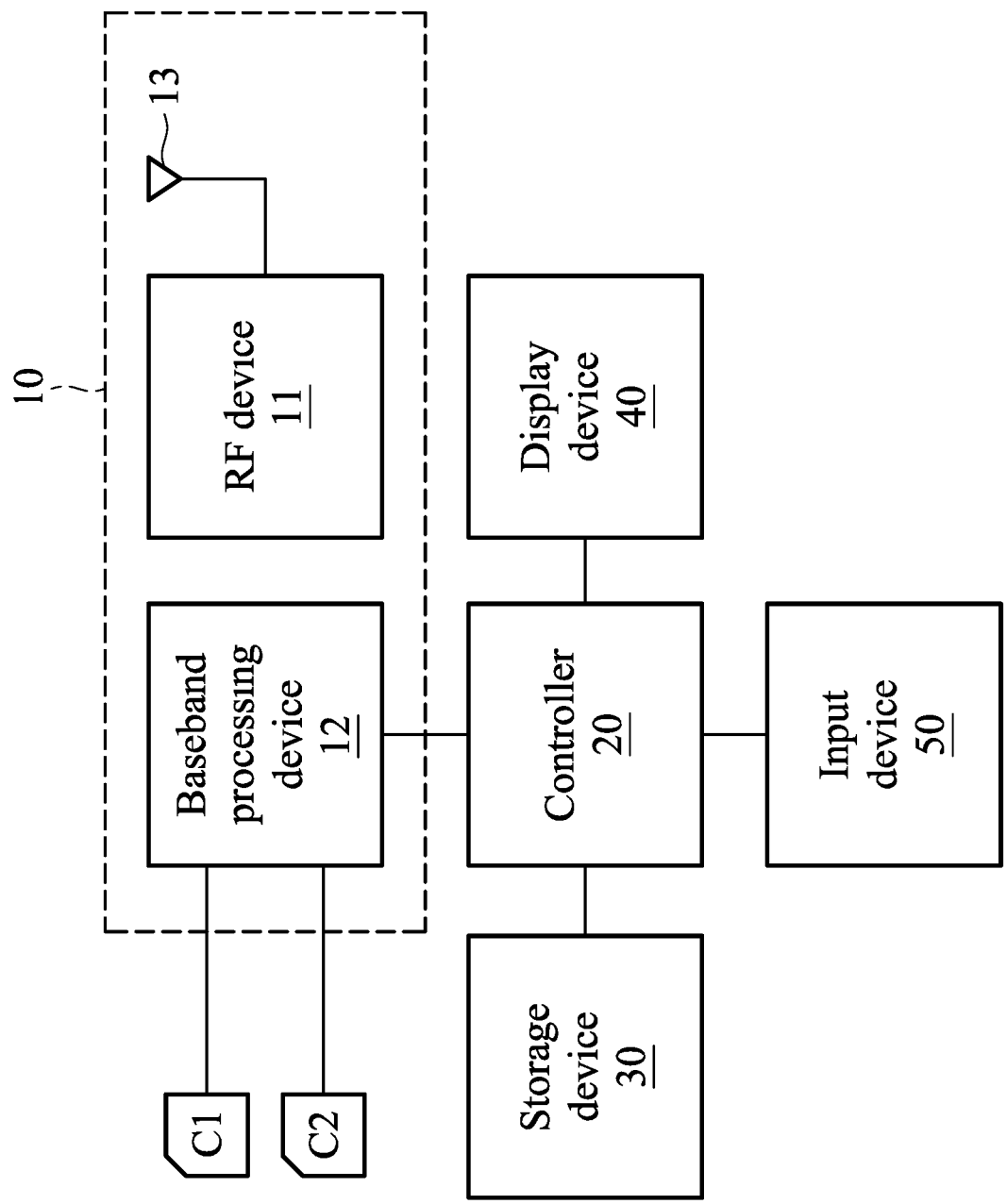
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 120. The wireless transceiver 10 includes a Radio Frequency (RF) device 11, a baseband processing device 12, and an antenna 13. The baseband processing device 12 is configured to perform baseband signal processing and control the communications between two subscriber identity cards (denoted as C1 and C2) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, the baseband processing device 12 may include a dual-card controller (not shown) for powering the subscriber identity cards C1 and C2 with the same or different voltage levels according to the requirements thereof by a Power Management Integrated Chip (PMIC) and a battery, wherein the voltage level for each subscriber identity card is determined during initiation. The baseband processing device 12 may read data from one of the subscriber identity cards C1 and C2, and writes data to one of the subscriber identity cards C1 and C2 via the dual-card controller. In addition, the dual-card controller selectively transfers clocks, resets, and/or data signals to the subscriber identity cards C1 and C2 according to instructions issued by the baseband processing device 12.

In another embodiment, the baseband processing device 12 may include two interfaces (not shown) which independently handle the connections to the subscriber identity cards C1 and C2. It should be understood that the hardware architecture shown in FIG. 2 may be modified to include more than two subscriber identity cards, and the application cannot be limited thereto.

The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technologies, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 900 MHz, 2100 MHz, or 2.6 GHz utilized in LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, which includes various circuitry for providing the function of data processing and computing, controlling the wireless transceiver 10 for wireless communications with the service networks 120 and 130, storing and retrieving data to and from the storage device 30, sending a series of frame data (e.g. representing text messages, graphics, images, etc.) to the display device 40, and receiving signals from the input device 50. In particular, the controller 20 coordinates the aforementioned operations of the wireless transceiver 10, the storage device 30, the display device 40, and the input device 50 for performing the method of the present application.

In another embodiment, the controller 20 may be incorporated into the baseband processing device 12, serving as a baseband processor.

As will be appreciated by persons skilled in the art, the circuitry of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application. For example, the mobile communication device 110 may further include a WiFi device for providing the function of WiFi communications, a Global Positioning System (GPS) device, and/or a power, etc.

Figure 3:
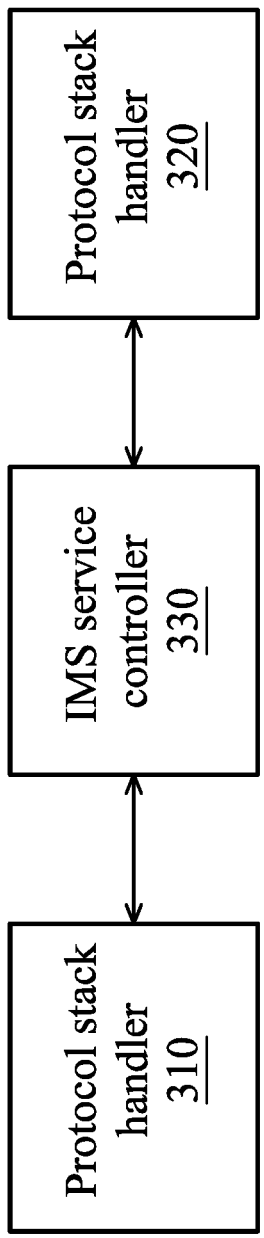
FIG. 3 is a block diagram illustrating the software architecture of the mobile communication device 110 according to an embodiment of the application.

FIG. 3 is a block diagram illustrating the software architecture of the mobile communication device 110 according to an embodiment of the application. The exemplary software architecture includes two protocol stack handlers 310 and 320, and an IMS service controller 330. The protocol stack handler 310, when executed by a processor, is configured to communicate with the service network 120 using the subscriber identity card C1, while the protocol stack handler 320, when executed by a processor, is configured to communicate with the service network 130 using the subscriber identity card C2. The IMS service controller 330 is responsible for monitoring radio conditions of the service networks 120 and 130 and allocating RF resource to the protocol stack handlers 310 and 320.

Figure 4A:
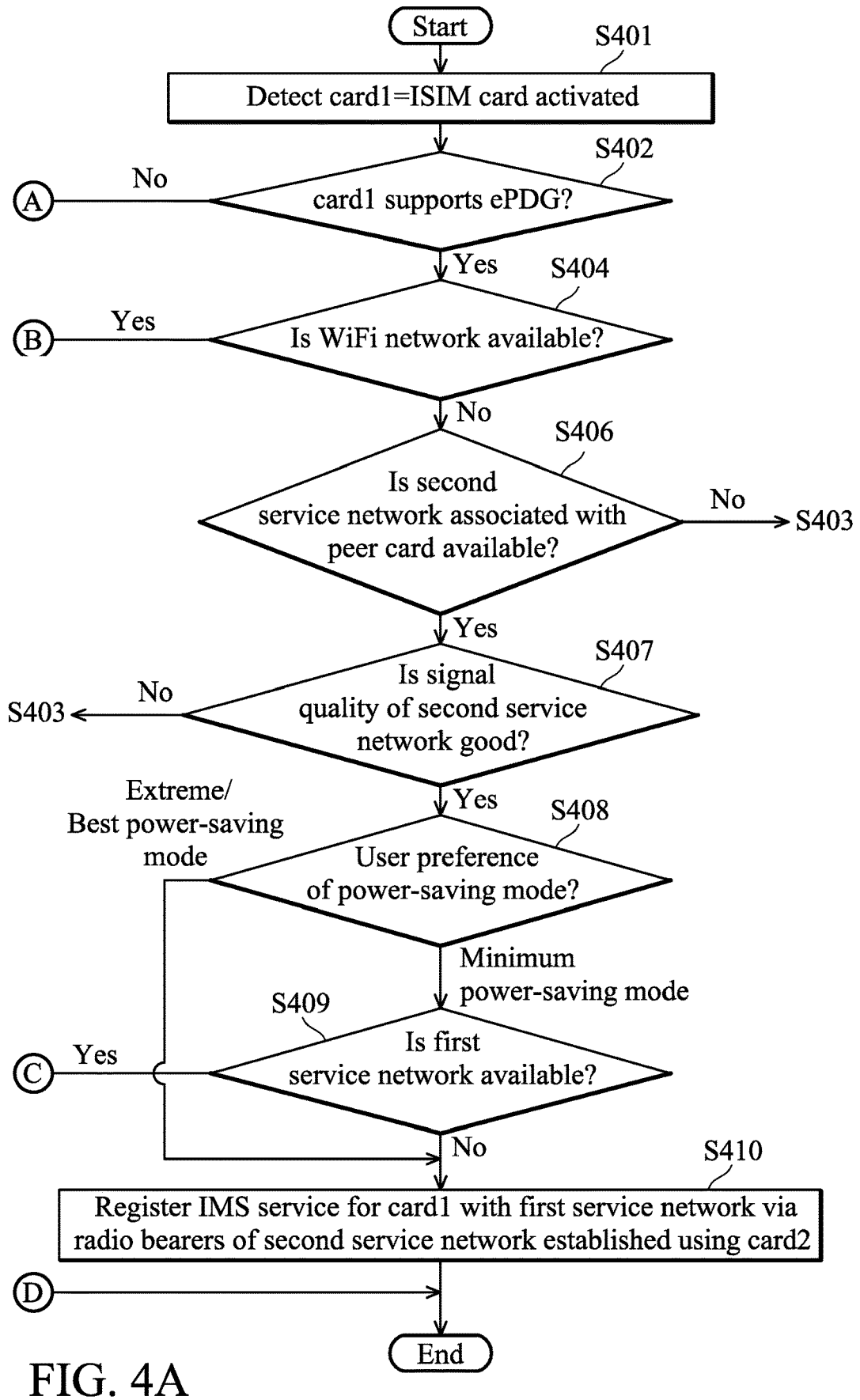
FIG. 4A and FIG. 4B show a flow chart illustrating the method for coordinating communication operations associated with a plurality of subscriber identity cards for IMS registration according to an embodiment of the application.
Figure 4B:
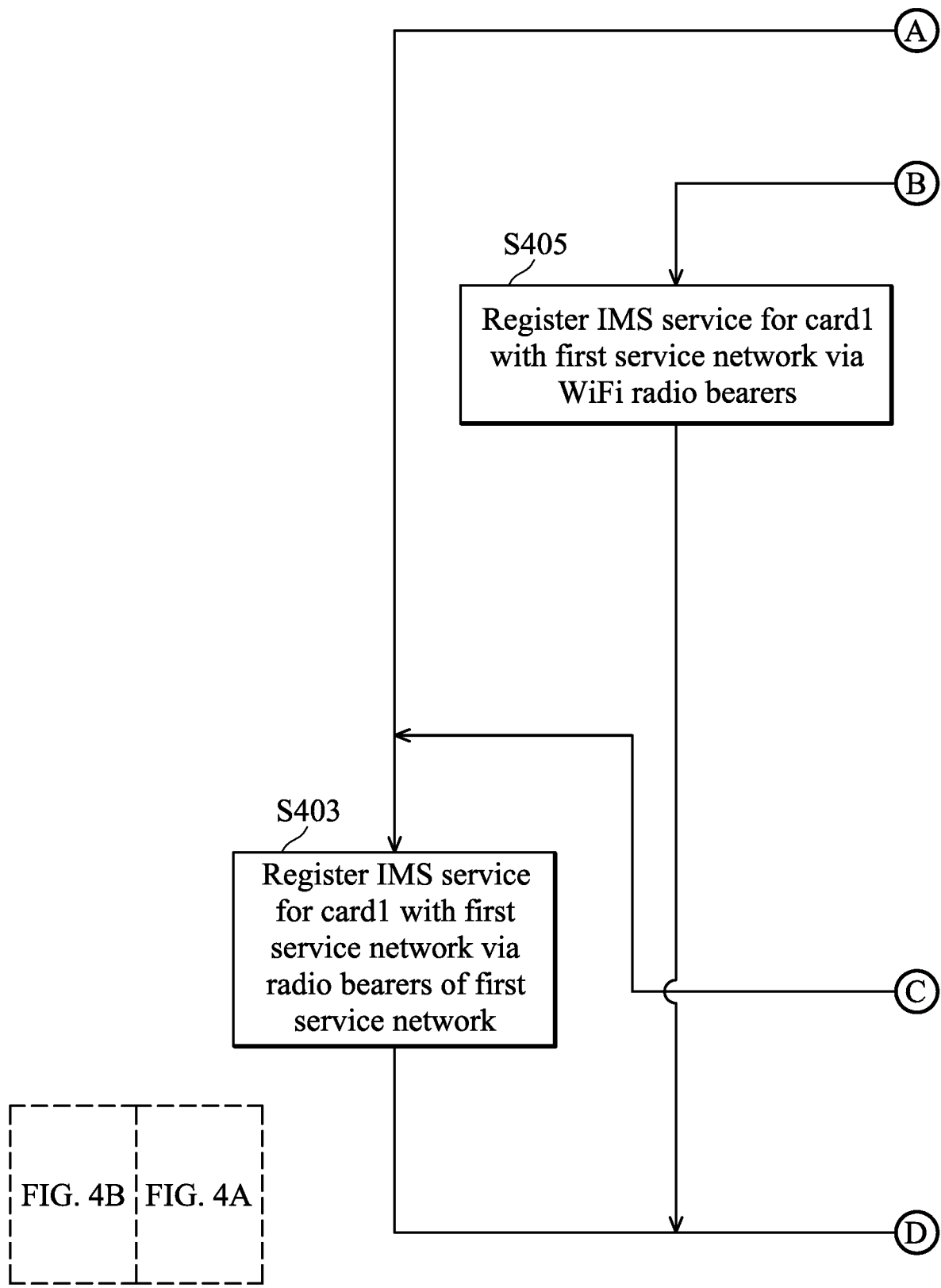

FIG. 4A and FIG. 4B show a flow chart illustrating the method for coordinating communication operations associated with a plurality of subscriber identity cards for IMS registration according to an embodiment of the application. In this embodiment, the method is applied to a mobile communication device coupled with at least two subscriber identity cards, in which the communication operations associated with the subscriber identity cards share a single wireless transceiver. To begin, the mobile communication device detects that one subscriber identity card (referred to herein as the first subscriber identity card) is activated and it is an IP Multimedia Service Identity Module (ISIM) card (i.e., a USIM card supporting the IMS service) (step S401).

Next, the mobile communication device determines whether the first subscriber identity card supports the ePDG service (step S402), and if not, uses the first subscriber identity card to establish radio bearers with the service network to which the first subscriber identity card is subscribed (referred to herein as the first service network) and to register the IMS service with the first service network via the radio bearers (step S403). Specifically, the first subscriber identity card has valid subscription to the services provided by the first service network. For example, the first subscriber identity card may be issued by the operator of the first service network. Otherwise, if the first subscriber identity card supports the ePDG service, the mobile communication device determines whether a WiFi network is available (step S404), and if so, uses the first subscriber identity card to register the IMS service with the first service network via the WiFi radio bearers (step S405). Specifically, the mobile communication device first establishes radio bearers with the WiFi network, and then accesses the ePDG of the first service network via the WiFi radio bearers and registers the IMS service with the first service network through the ePDG Subsequent to step S404, if there's no WiFi network available, the mobile communication device determines whether the other subscriber identity card, i.e., the peer subscriber identity card (referred to herein as the second subscriber identity card) is activated and the service network to which the second subscriber identity card is subscribed (referred to herein as the second service network) is available (step S406). The second subscriber identity card may be a real subscriber identity card, such as the subscriber identity card C1 or C2 in FIG. 2, or may be a virtual subscriber identity card (or referred to as a VSIM). If the second service network is not available, the method proceeds to step S403.

Subsequent to step S406, if the second subscriber identity card is activated and the second service network is available, the mobile communication device determines whether the signal quality of the second service network is good enough (step S407), and if so, determines whether the user preference indicates the use of the extreme power-saving mode, the best power-saving mode, or the minimum power-saving mode (step S408). Otherwise, if the signal quality of the second service network is not good enough, the method proceeds to step S403.

In another embodiment, steps S407 and 408 may be optional. That is, steps S407 and S408 may be omitted, and the 'Yes' branch of step S406 may proceed to S409 directly.

Subsequent to step S408, if the minimum power-saving mode is selected by the user, it means that the user prefers to use the radio bearers of the first service network to register the IMS service for the first subscriber identity card, so the mobile communication device determines whether the first service network is available (step S409), and if so, the method proceeds to step S403. Subsequent to step S408, if the extreme power-saving mode or the best power-saving mode is selected by the user, it means that the user prefers to use the radio bearers of the peer SIM network (i.e., the second service network), to register the IMS service for the first subscriber identity card, so the mobile communication device uses the first subscriber identity card to register the IMS service with the first service network via the radio bearers of the second service network (step S410), and the method ends.

Subsequent to step S409, if the first service network is not available, the method proceeds to step S410.

Please note that, after the IMS registration, the mobile communication device may keep monitoring the radio conditions of the first and second service networks and the WiFi network, in case the signal quality of the currently used radio bearers may deteriorate, causing the IMS MT call for the second subscriber identity card to be missed. In addition, the monitoring of the radio conditions may reduce the time for call establishment when it is required to switch to another radio carrier for making an IMS call. For example, the signal quality of the first or second service network may refer to the Reference Signal Receiving Power (RSRP), Reference Signal Received Quality (RSRQ), Received Signal Code Power (RSCP), or Ec/N0, etc., and the signal quality of the WiFi network may refer to the Received Signal Strength Indicator (RSSI) or Signal-to-Noise Ratio (SNR). Specifically, when the signal quality of the currently used radio bearers is not suitable anymore, the mobile communication device may switch to register the IMS service via the network that has good signal quality and meets the user's preference. For example, in cases where the currently used radio bearers belong to the first or second service network, the WiFi radio bearers, if available and suitable, are always prioritized to be used as the replacement for the IMS registration for the first subscriber identity card. Otherwise, if there's no available and suitable WiFi radio bearer, the mobile communication device may follow the user preference to choose the first or second service network for the IMS registration for the first subscriber identity card.

To further clarify, when the best power-saving mode is selected by the user, the mobile communication device may periodically measure the signal quality of the first service network as it is registered to the first service network via the radio bearers of the second service network. Therefore, when it is required to make an IMS call via the radio bearers of the first service network, the time for call establishment may be reduced due to the radio condition of the first service network being updated by the periodic measurements. In one embodiment, the periodic measurements may be performed more frequently if the signal quality of the second service network falls below a predetermined threshold, or if the mobile communication device is moving in a high speed. In another embodiment, the periodic measurements may be skipped if the first and second service networks belong to the same Public Land Mobile Network (PLMN). When the extreme power-saving mode is selected by the user, the mobile communication device may only search for the first service network when it is required to make an IMS call via the radio bearers of the first service network. As such, power consumption may be saved even more than the best power-saving mode, while the latency of the IMS call establishment may be longer.

Figure 5:
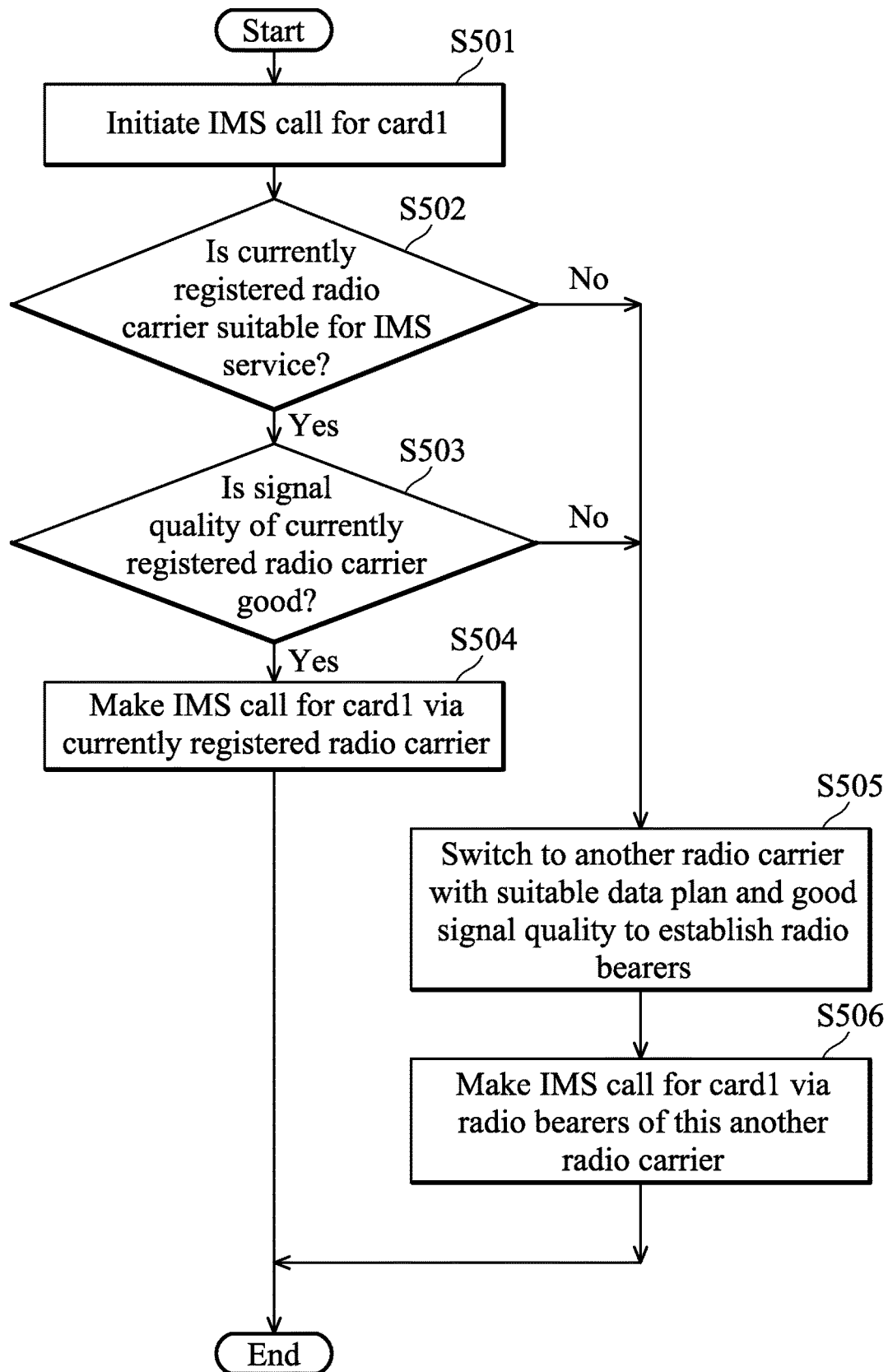
FIG. 5 is a flow chart illustrating the method for coordinating communication operations associated with a plurality of subscriber identity cards for IMS call establishment according to an embodiment of the application.

FIG. 5 is a flow chart illustrating the method for coordinating communication operations associated with a plurality of subscriber identity cards for IMS call establishment according to an embodiment of the application. In this embodiment, the method is applied subsequent to IMS registration as shown in the embodiment of FIG. 4A and FIG. 4B. To begin, the mobile communication device initiates an IMS MO/MT call for the first subscriber identity card (step S501), and then determines whether the radio carrier through which the IMS service for the first subscriber identity card is currently registered is suitable for making an IMS call (step S502). Specifically, the currently registered radio carrier may be one of the first service network, the second service network, and a WiFi network. In one embodiment, the currently registered radio carrier is determined to be suitable for making an IMS call, if the data plan of the currently registered radio carrier has unlimited quota or more quota for data service than the data plan of other radio carriers. For example, the data plan of a WiFi network generally has unlimited quota for data services and is determined suitable for making an IMS call. In another embodiment, the currently registered radio carrier is determined to be suitable for making an IMS call, if the Quality of Service (QoS) of the currently registered radio carrier is able to satisfy making an IMS call.

If the currently registered radio carrier is suitable, the mobile communication device determines whether the signal quality of the currently registered radio carrier is good enough (step S503). If the signal quality is good enough, the mobile communication device makes the IMS call for the first subscriber identity card via the radio bearers of the currently registered radio carrier (step S504), and the method ends.

In another embodiment, step S503 may be optional. That is, step S503 may be omitted, and the 'Yes' branch of step S502 may proceed to S504 directly.

Subsequent to steps S502 and S503, if not, the mobile communication device switches to another radio carrier to establish radio bearers, whose data plan is suitable for making an IMS call and signal quality is good enough (step S505). Specifically, this other radio carrier may be another one of the first service network, the second service network, and a WiFi network. Next, the mobile communication device makes an IMS call for the first subscriber identity card via the established radio bearers of this another radio carrier (step S506), and the method ends.

Figure 6:
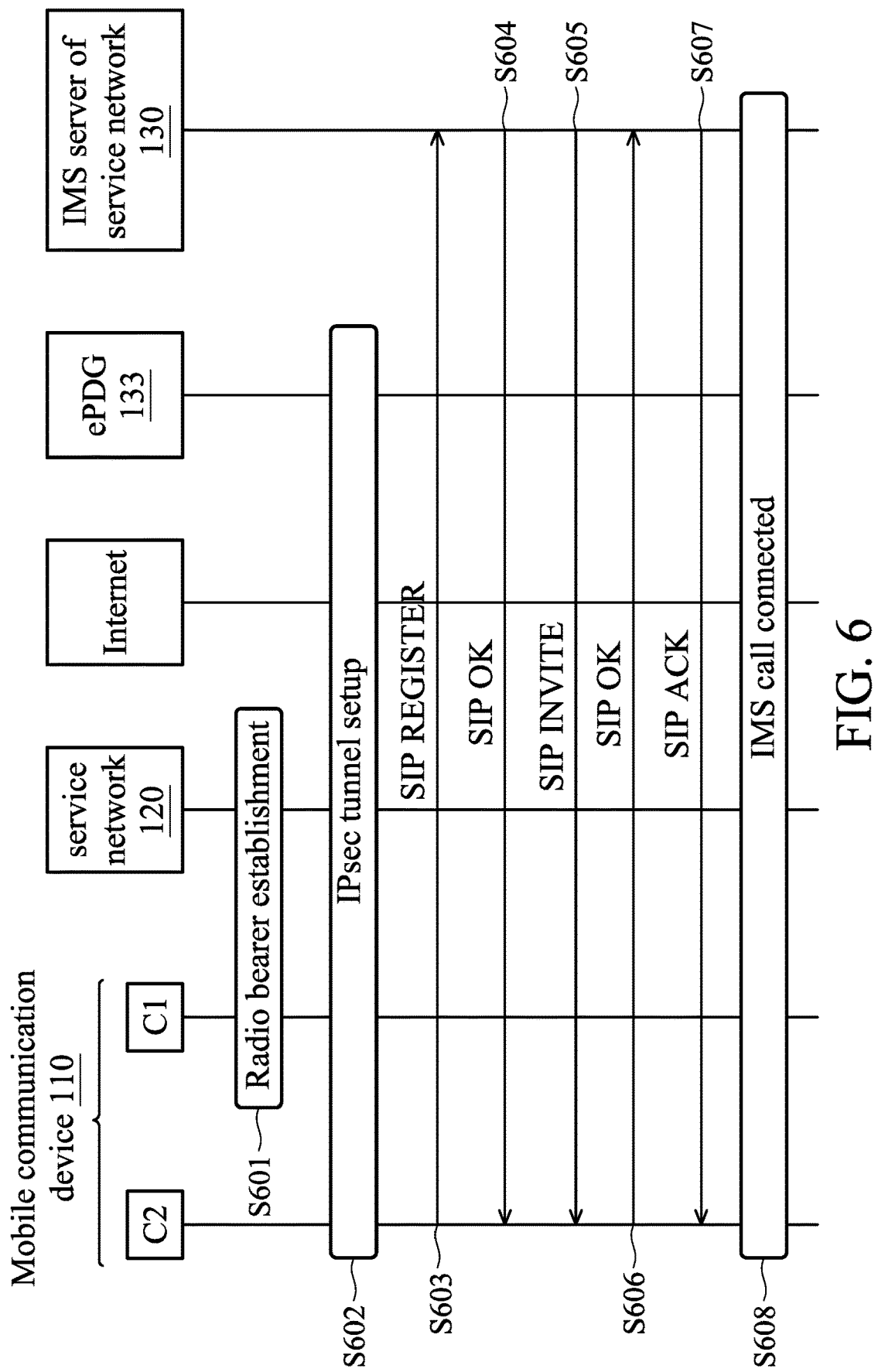
FIG. 6 is a message sequence chart illustrating receipt of an IMS MT call through radio bearers established with a peer subscriber identity card according to an embodiment of the application.

FIG. 6 is a message sequence chart illustrating receipt of an IMS MT call through radio bearers established with a peer subscriber identity card according to an embodiment of the application. In this embodiment, it is assumed that there's no WiFi coverage in the current location of the mobile communication device 110. To begin, the mobile communication device 110 uses the subscriber identity card C1 to establish one or more radio bearers with service network 120 (step S601). After that, the mobile communication device 110 uses the subscriber identity card C2 to set up an Internet Protocol Security (IPsec) tunnel with the ePDG 133 via the radio bearers (step S602), wherein the IPsec tunnel provides secure IP communications between the mobile communication device 110 and the ePDG 133 with authentication and encryption of each IP packet communicated therebetween.

Next, the mobile communication device 110 uses the subscriber identity card C2 to register with the IMS server of the service network 130 through the IPsec tunnel, by sending a Session Initiation Protocol (SIP) REGISTER message (step S603). In response to receiving the SIP REGISTER message, the IMS server replies to the mobile communication device 110 with a SIP OK message through the IPsec tunnel (step S604). The registration with the IMS server of the service network 130 is completed successfully when the mobile communication device 110 receives the SIP OK message.

In one embodiment, the mobile communication device 110 may choose to perform the IMS registration with the subscriber identity card C2 through the service network 120, due to the mobile communication device 110 being in an IMS-VoPS (Voice over Packet System)-disabled area of the service network 130 (i.e., the deployment of the service network 130 in this area is disconnected from the IMS server of the service network 130).

Subsequently, the IMS server of the service network 130 sends a SIP INVITE message to the mobile communication device 110 through the IPsec tunnel in response to detecting that there's an incoming IMS call for the subscriber identity card C2 (step S605), wherein the SIP INVITE message indicates an IMS MT call for the subscriber identity card C2 (i.e., the callee ID in the SIP INVITE message corresponds to the subscriber identity card C2). When receiving the SIP INVITE message, the mobile communication device 110 replies to the IMS server with a SIP OK message through the IPsec tunnel for accepting the IMS MT call (step S606), and then receives a SIP ACK message from the IMS server through the IPsec tunnel (step S607). Upon receiving the SIP ACK message, the IMS MT call for the subscriber identity card C2 is connected (step S608).

In another embodiment, when receiving the SIP INVITE message in step S605, the mobile communication device 110 may generate a notification of the IMS MT call for the user, and the mobile communication device 110 may reject the IMS MT call by replying to the IMS server with a SIP 486 or 488 message, instead of performing steps S606 to S608.

Figure 7:
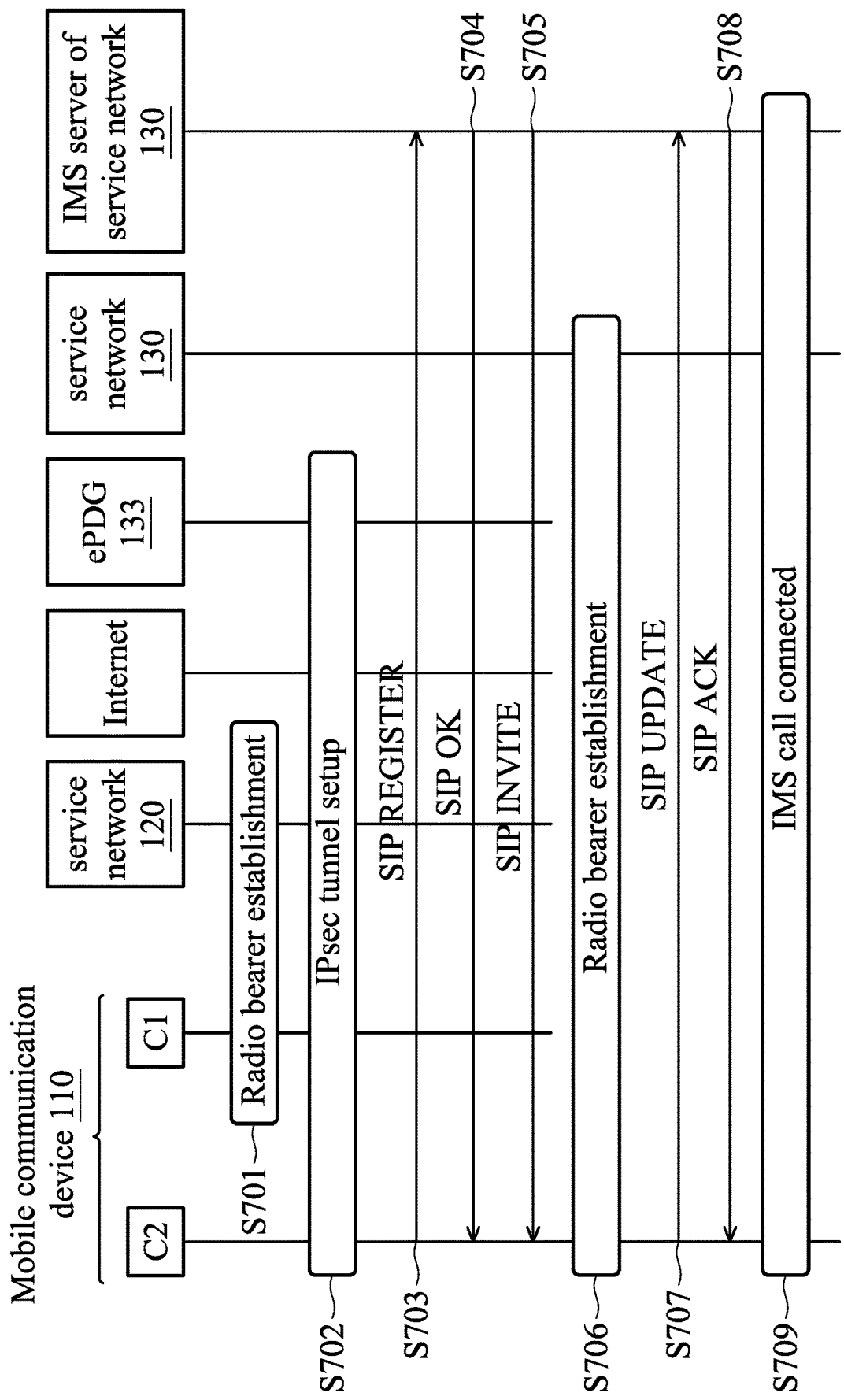
FIG. 7 is a message sequence chart illustrating receipt of an IMS MT call through radio bearers established with a peer subscriber identity card according to another embodiment of the application.

FIG. 7 is a message sequence chart illustrating receipt of an IMS MT call through radio bearers established with a peer subscriber identity card according to another embodiment of the application. In this embodiment, it is assumed that there's no WiFi coverage in the current location of the mobile communication device 110. Similar to steps S601 to S604, the mobile communication device 110 uses the subscriber identity card C1 to establish one or more first radio bearers with service network 120, uses the subscriber identity card C2 to set up an IPsec tunnel with the ePDG 133 via the first radio bearers, and registers with the IMS server of the service network 130 through the IPsec tunnel (step S701-S704).

Subsequently, the IMS server of the service network 130 sends a SIP INVITE message to the mobile communication device 110 through the IPsec tunnel in response to detecting that there's an incoming IMS call for the subscriber identity card C2 (step S705), wherein the SIP INVITE message indicates an IMS MT call for the subscriber identity card C2 (i.e., the callee ID in the SIP INVITE message corresponds to the subscriber identity card C2). When receiving the SIP INVITE message, the mobile communication device 110 uses the subscriber identity card C2 to establish one or more second radio bearers with service network 130 (step S706).

After that, the mobile communication device 110 sends a SIP UPDATE message to the IMS server of the service network 130 via the second radio bearers (step S707), and then receives a SIP ACK message from the IMS server via the second radio bearers (step S708). Specifically, the SIP UPDATE message includes the new IP address of the IMS service for the second subscriber identity card, wherein the new IP address is assigned by the service network 130 as the mobile communication device 110 established the second radio bearers to attach to the service network 130. Upon receiving the SIP ACK message, the IMS MT call for the subscriber identity card C2 is connected (step S709).

In another embodiment, if the service network 130 is not available in the current location of the mobile communication device 110, a timer may be started for the mobile communication device 110 to keep searching for the service network 130. If the mobile communication device 110 fails to find the service network 130 when the timer expires, the mobile communication device 110 may set up the IMS MT call through the service network 120 (similar to steps S606 to 608), instead of performing steps S706 to S709.

In another embodiment, before step S705, the mobile communication device 110 may be configured to monitor the signal quality of the service network 130, so that step S706 may be completed as soon as possible to reduce the call setup time.

Please note that, in this embodiment, the QoS of the IMS MT call may be guaranteed by switching back to the service network 130 to set up the IMS MT call via the radio bearers dedicated for IMS services.

Particularly, in cases where only the protocol stack handler 310 supports the LTE/LTE-A/TD-LTE technology, both the subscriber identity cards C1 and C2 support the LTE/LTE-A/TD-LTE technology, and both the service networks 120 and 130 are LTE/LTE-A/TD-LTE networks, the protocol stack handler 310 may be configured to use the subscriber identity card C1 to establish the first radio bearers with the service network 120 and register the subscriber identity card C2 with the IMS server of the service network 130 through the service network 120. After that, when receiving a SIP INVITE message indicating an IMS MT call for the subscriber identity card C2 through the service network 120, the protocol stack handler 310 is configured to switch to use the subscriber identity card C2 to establish the second radio bearers with the service network 130 for receiving the IMS MT call, and the protocol stack handler 320 is configured to switch to use the subscriber identity card C1. It should be understood that the operation flow is similar to the embodiment of FIG. 7, except that the first radio bearers established with the service network 120 will be released as soon as the protocol stack handler 310 switches from using the subscriber identity card C1 to using the subscriber identity card C2.

Figure 8:
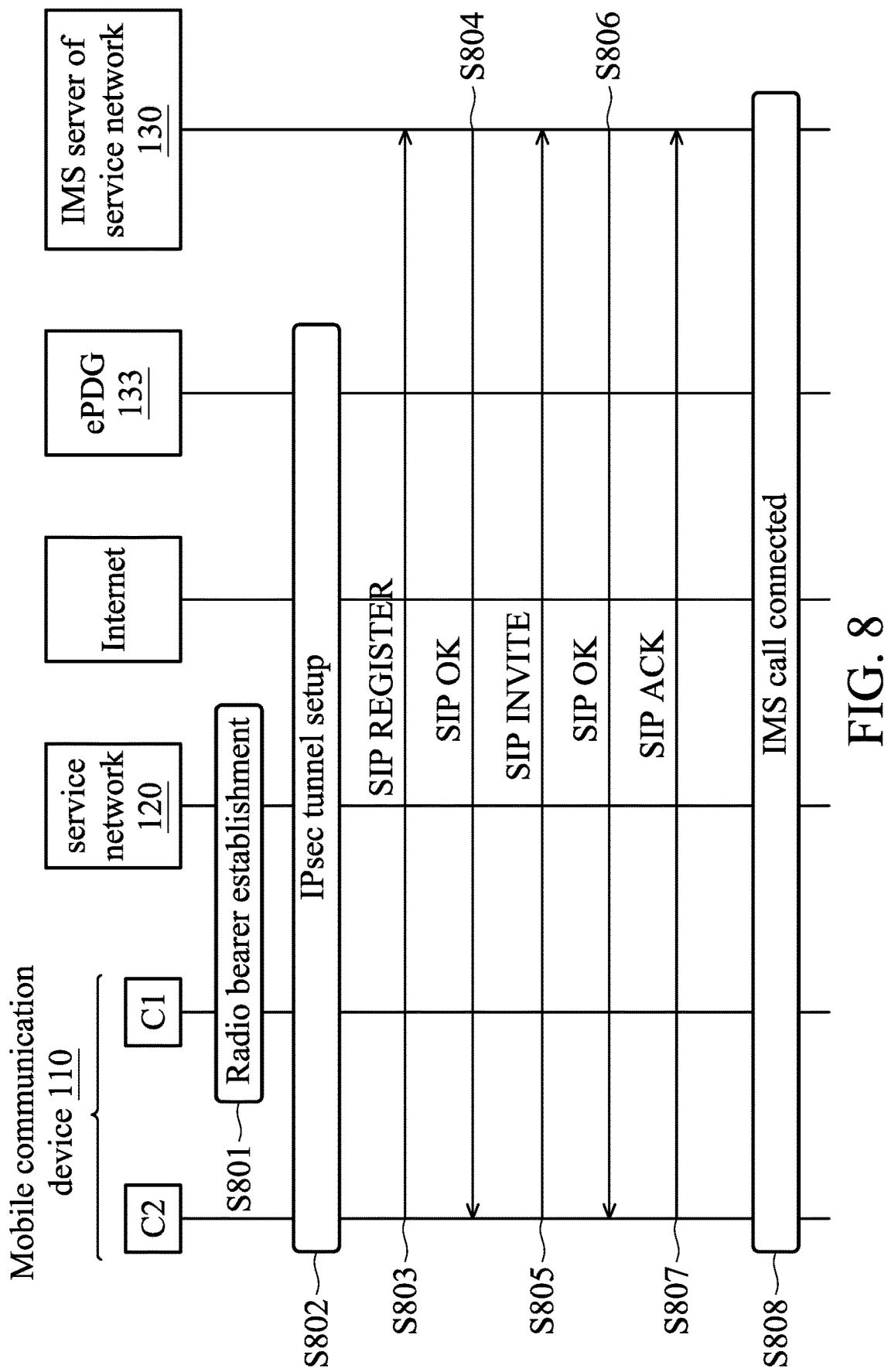
FIG. 8 is a message sequence chart illustrating making an IMS MO call through radio bearers established with a peer subscriber identity card according to an embodiment of the application.

FIG. 8 is a message sequence chart illustrating making an IMS MO call through radio bearers established with a peer subscriber identity card according to an embodiment of the application. In this embodiment, it is assumed that there's no WiFi coverage in the current location of the mobile communication device 110. Similar to steps S601 to S604, the mobile communication device 110 uses the subscriber identity card C1 to establish one or more radio bearers with service network 120, uses the subscriber identity card C2 to set up an IPsec tunnel with the ePDG 133 via the radio bearers, and registers with the IMS server of the service network 130 through the IPsec tunnel (step S801-S804).

Subsequently, in response to initiating an IMS MO call for the subscriber identity card C2, the mobile communication device 110 sends a SIP INVITE message to the IMS server of the service network 130 through the IPsec tunnel (step S805), wherein the SIP INVITE message indicates an IMS MO call for the subscriber identity card C2 (i.e., the caller ID in the SIP INVITE message corresponds to the subscriber identity card C2). When receiving the SIP INVITE message, the IMS server replies to the mobile communication device 110 with a SIP OK message through the IPsec tunnel for accepting the IMS MO call (step S806), and then the mobile communication device 110 sends a SIP ACK message to the IMS server through the IPsec tunnel (step S807). Upon receiving the SIP ACK message, the IMS MO call for the subscriber identity card C2 is connected (step S808).

Figure 9:
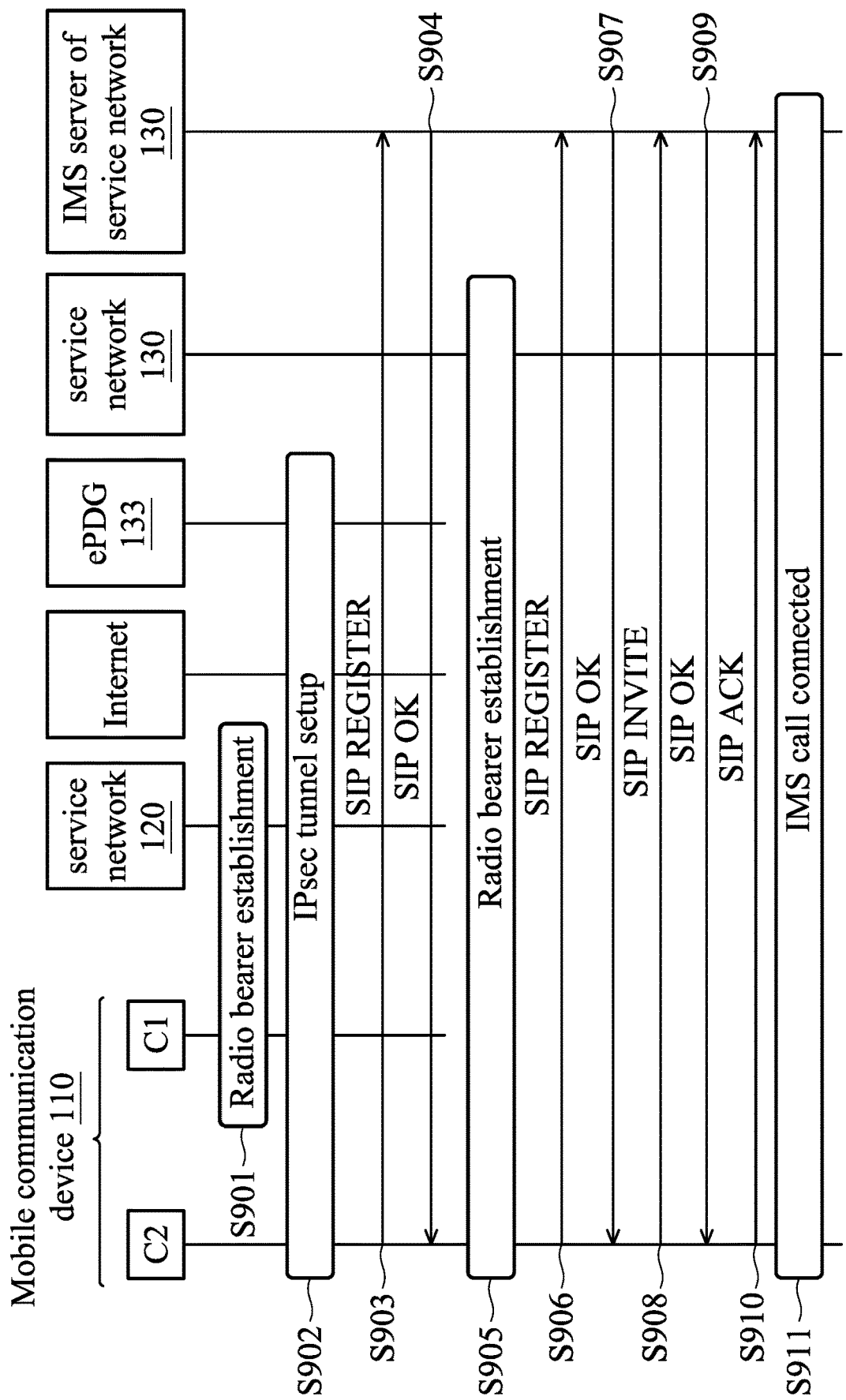
FIG. 9 is a message sequence chart illustrating making an IMS MO call through radio bearers established with a peer subscriber identity card according to another embodiment of the application.

FIG. 9 is a message sequence chart illustrating making an IMS MO call through radio bearers established with a peer subscriber identity card according to another embodiment of the application. In this embodiment, it is assumed that there's no WiFi coverage in the current location of the mobile communication device 110. Similar to steps S601 to S604, the mobile communication device 110 uses the subscriber identity card C1 to establish one or more first radio bearers with service network 120, uses the subscriber identity card C2 to set up an IPsec tunnel with the ePDG 133 via the first radio bearers, and registers with the IMS server of the service network 130 through the IPsec tunnel (step S901-S904).

Subsequently, in response to initiating an IMS MO call for the subscriber identity card C2, the mobile communication device 110 uses the subscriber identity card C2 to establish one or more second radio bearers with service network 130 (step S905), and then registers with the IMS server of the service network 130 via the second radio bearers by sending a SIP REGISTER message (step S906). In response to receiving the SIP REGISTER message, the IMS server replies to the mobile communication device 110 with a SIP OK message (step S907). The registration with the IMS server of the service network 130 is completed successfully when the mobile communication device 110 receives the SIP OK message.

After that, the mobile communication device 110 sends a SIP INVITE message to the IMS server of the service network 130 via the second radio bearers (step S908), wherein the SIP INVITE message indicates an IMS MO call for the subscriber identity card C2 (i.e., the caller ID in the SIP INVITE message corresponds to the subscriber identity card C2).

When receiving the SIP INVITE message, the IMS server replies to the mobile communication device 110 with a SIP OK message for accepting the IMS MO call (step S909), and then the mobile communication device 110 sends a SIP ACK message to the IMS server (step S910). Upon receiving the SIP ACK message, the IMS MO call for the subscriber identity card C2 is connected (step S911).

In another embodiment, before step S905, the mobile communication device 110 may be configured to monitor the signal quality of the service network 130, so that step S706 may be completed as soon as possible to reduce the call setup time.

Please note that, in this embodiment, the QoS of the IMS MO call may be guaranteed by switching back to the service network 130 to set up the call via the radio bearers dedicated for IMS services.

Figure 10:
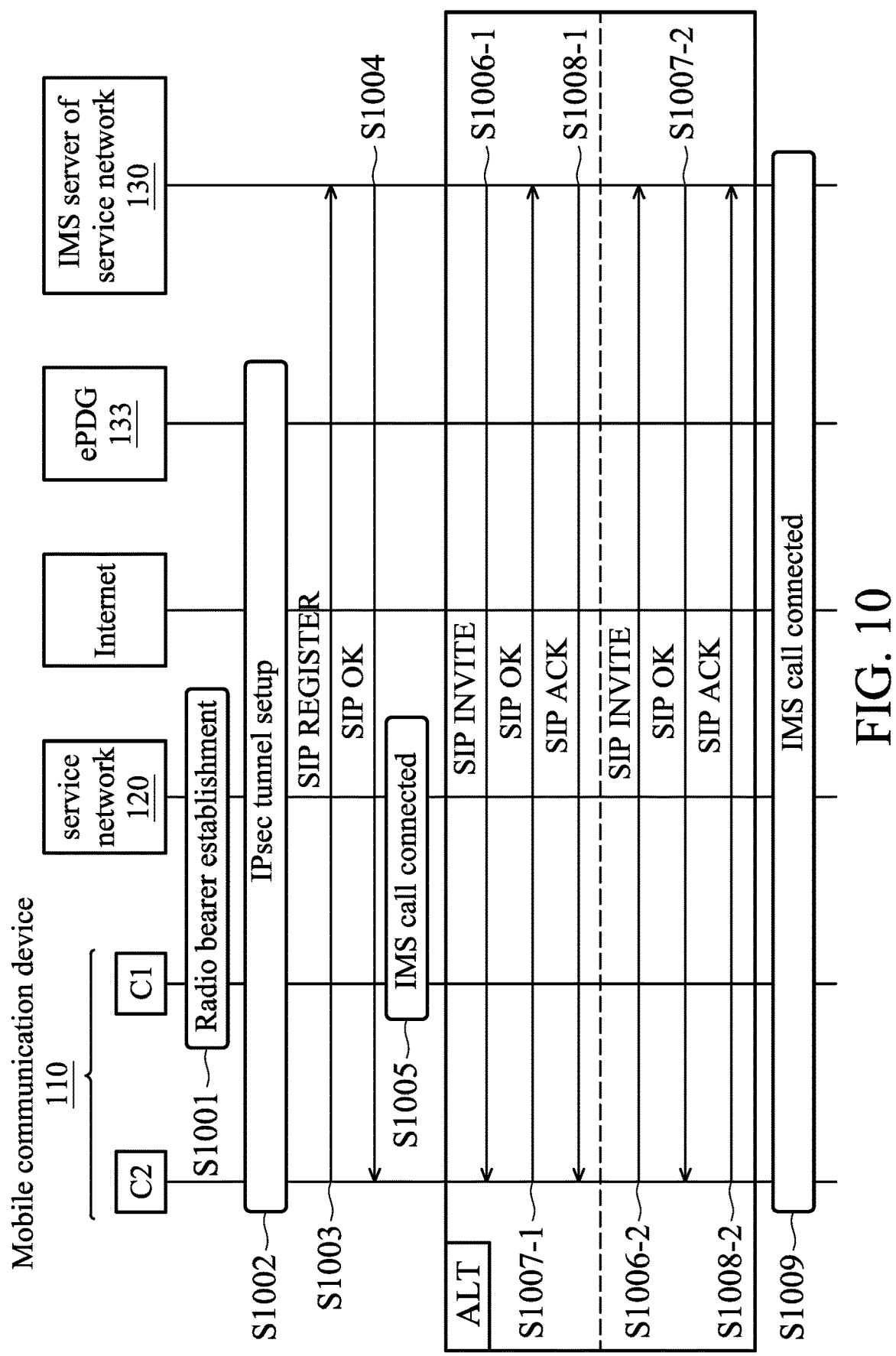
FIG. 10 is a message sequence chart illustrating receipt of an IMS MT call through radio bearers established with a peer subscriber identity card having an ongoing IMS call according to an embodiment of the application.

FIG. 10 is a message sequence chart illustrating receipt of an IMS MT call through radio bearers established with a peer subscriber identity card having an ongoing IMS call according to an embodiment of the application. In this embodiment, it is assumed that there's no WiFi coverage in the current location of the mobile communication device 110. Similar to steps S601 to S604, the mobile communication device 110 uses the subscriber identity card C1 to establish one or more radio bearers with service network 120, uses the subscriber identity card C2 to set up an IPsec tunnel with the ePDG 133 via the radio bearers, and registers with the IMS server of the service network 130 through the IPsec tunnel (step S1001-S1004).

Next, the mobile communication device 110 uses the subscriber identity card C1 to make an IMS call with the service network 120 (step S1005), wherein the IMS call may be an IMS MO call or IMS MT call.

During the IMS call for the subscriber identity card C1, an IMS MO/MT call is initiated. If an IMS MT call is initiated, the IMS server of the service network 130 sends a SIP INVITE message to the mobile communication device 110 through the IPsec tunnel in response to detecting that there's an incoming IMS call for the subscriber identity card C2 (step S1006-1), wherein the SIP INVITE message indicates an IMS MT call for the subscriber identity card C2 (i.e., the callee ID in the SIP INVITE message corresponds to the subscriber identity card C2). When receiving the SIP INVITE message, the mobile communication device 110 replies to the IMS server with a SIP OK message through the IPsec tunnel for accepting the IMS MT call (step S1007-1), and then receives a SIP ACK message from the IMS server through the IPsec tunnel (step S1008-1).

Otherwise, if an IMS MO call is initiated, the mobile communication device 110 sends a SIP INVITE message to the IMS server of the service network 130 through the IPsec tunnel (step S1006-2), wherein the SIP INVITE message indicates an IMS MO call for the subscriber identity card C2 (i.e., the caller ID in the SIP INVITE message corresponds to the subscriber identity card C2). When receiving the SIP INVITE message, the IMS server replies to the mobile communication device 110 with a SIP OK message through the IPsec tunnel for accepting the IMS MO call (step S1007-2), and then the mobile communication device 110 sends a SIP ACK message to the IMS server through the IPsec tunnel (step S1008-2).

Upon receiving or sending the SIP ACK message, the IMS MT/MO call for the subscriber identity card C2 is connected (step S1009).

Please note that the embodiment of FIG. 10 is for illustrative purposes only and the teachings of FIG. 10 may also be applied to the situation where the mobile communication device 110 uses the subscriber identity card C2 to make an IMS call with the service network 130 first and then uses the subscriber identity card C1 to make an IMS call with the service network 120. In this embodiment, the mobile communication device 110 may realize a dual-talk function for both subscriber identity cards via the radio access provided by only one of the subscriber identity cards, i.e., using only one RF hardware. In another embodiment, the dual-talk function is only allowed when the established radio bearers of the service network 120 have good signal quality and are able to guarantee good QoS.

Figure 11:
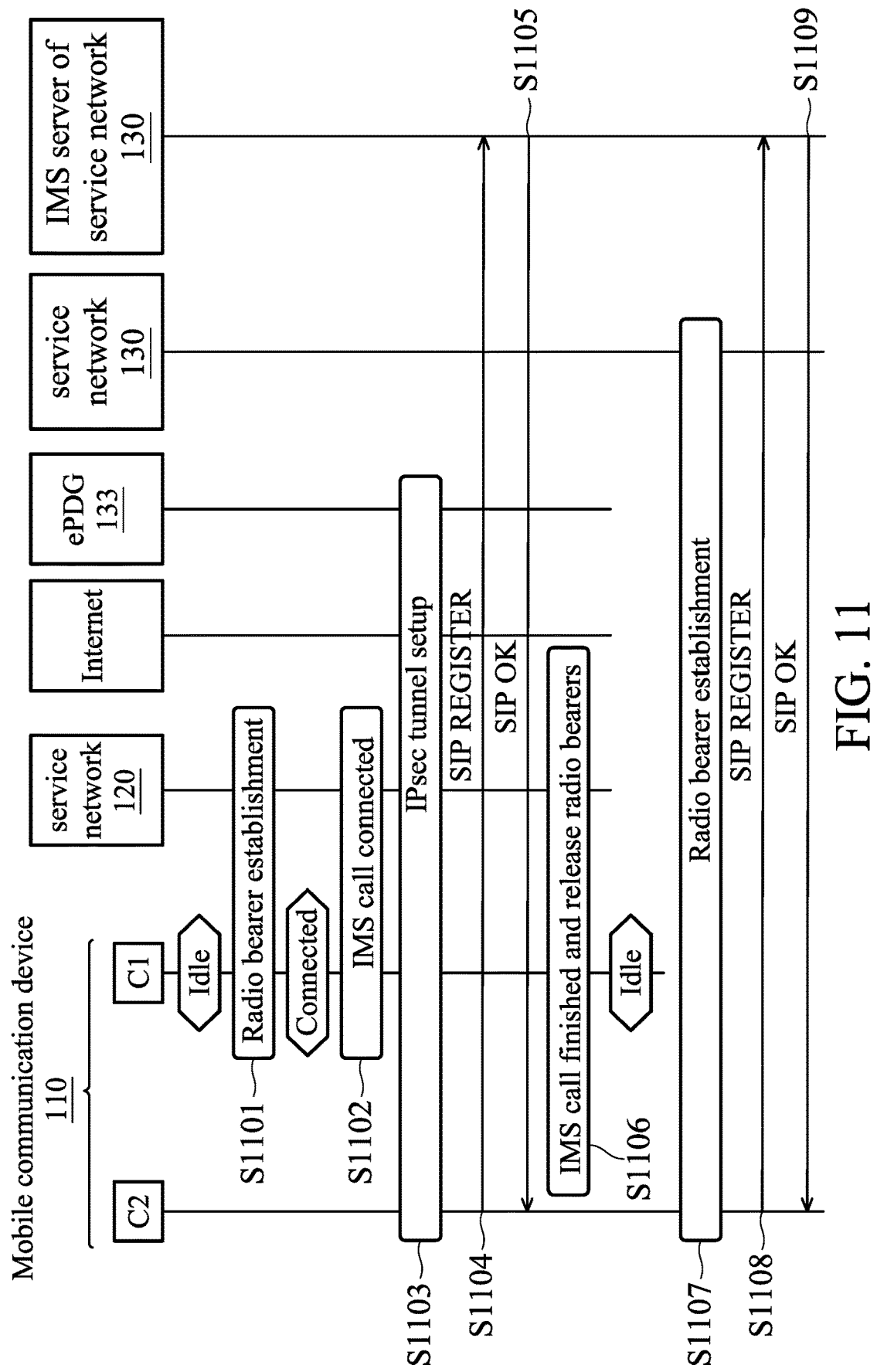
FIG. 11 is a message sequence chart illustrating an exemplary IMS registration through radio bearers established with a peer subscriber identity card having an ongoing IMS call according to an embodiment of the application.

FIG. 11 is a message sequence chart illustrating an exemplary IMS registration through radio bearers established with a peer subscriber identity card having an ongoing IMS call according to an embodiment of the application. In this embodiment, it is assumed that there's no WiFi coverage in the current location of the mobile communication device 110. To begin, the mobile communication device 110 uses the subscriber identity card C1 to establish one or more first radio bearers with service network 120 (step S1101), and then enters the connected mode from the idle mode when the first radio bearers are established successfully. Next, the mobile communication device 110 uses the subscriber identity card C1 to make an IMS/PS call with the service network 120 via the first radio bearers (step S1102).

Due to the IMS/PS call for the subscriber identity card C1 is ongoing, the mobile communication device 110 uses the subscriber identity card C2 to set up an IPsec tunnel with the ePDG 133 via the first radio bearers (step S1103), and then registers with the IMS server of the service network 130 through the IPsec tunnel by sending a SIP REGISTER message (step S1104). In response to receiving the SIP REGISTER message, the IMS server replies to the mobile communication device 110 with a SIP OK message through the IPsec tunnel (step S1105).

Next, the mobile communication device 110 releases the first radio bearers when the IMS/PS call for the subscriber identity card C1 is finished (step S1106), and then returns to the idle mode from the connected mode.

Due to the IMS/PS call for the subscriber identity card C1 is finished, the mobile communication device 110 switches to perform IMS registration through the service network 130. Specifically, the mobile communication device 110 uses the subscriber identity card C2 to establish one or more second radio bearers with service network 130 (step S1107), and then registers with the IMS server of the service network 130 via the second radio bearers by sending a SIP REGISTER message (step S1108). In response to receiving the SIP REGISTER message, the IMS server replies to the mobile communication device 110 with a SIP OK message (step S1109).

For the convenience of understanding, the service networks 120 and 130 described in FIGS. 6 to 11 may be taken as the second service network and the first service network in the embodiment of FIG. 4A and FIG. 4B, respectively, and the subscriber identity cards C1 and C2 described in FIGS. 6 to 11 may be taken as the second subscriber identity card and the first subscriber identity card in the embodiment of FIG. 4A and FIG. 4B, respectively.

In view of the forgoing embodiments, it will be appreciated that the present application reduces power consumption by activating only one protocol stack handler (which may be referred to as a software modem) to provide IMS services for all subscriber identity cards. Advantageously, power consumption of the mobile communication device is reduced. Moreover, the present application improves budget control by selecting just one subscriber identity card that has the best data plan to support the activated protocol stack handler for providing IMS services for all subscriber identity cards.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a wireless transceiver, configured to perform wireless transmission and reception to and from a first service network and a second service network; and
   a controller, configured to use a first subscriber identity card to establish one or more first radio bearers with the first service network via the wireless transceiver, wherein when the one or more first radio bearers are established between the mobile communication device and the first service network, the mobile communication device is allowed to transmit one or more data packets to the first service network,
   the controller being further configured to:
   use a second subscriber identity card to set up an Internet Protocol Security (IPsec) tunnel with a non-3GPP access gateway of the second service network via the first radio bearers, and
   use the second subscriber identity card to register an IP Multimedia Subsystem (IMS) service with the second service network via the IPsec tunnel.

2. The mobile communication device of claim 1, wherein the non-3GPP access gateway includes an evolved Packet Data Gateway (ePDG).

3. The mobile communication device of claim 1, wherein the controller is further configured to receive, via the IPsec tunnel, a Session Initiation Protocol (SIP) INVITE message indicating an IMS Mobile-Terminated (MT) call for the second subscriber identity card.

4. The mobile communication device of claim 3, wherein the controller is further configured to receive the IMS MT call for the second subscriber identity card via the IPsec tunnel in response to receiving the SIP INVITE message.

5. The mobile communication device of claim 3, wherein the controller is further configured to generate a notification of the IMS MT call for a user of the mobile communication device and reject the IMS MT call, in response to receiving the SIP INVITE message.

6. The mobile communication device of claim 3, wherein the controller is further configured to use the second subscriber identity card to establish one or more second radio bearers with the second service network via the wireless transceiver, and receive the IMS MT call for the second subscriber identity card via the second radio bearers, in response to receiving the SIP INVITE message.

7. The mobile communication device of claim 3, wherein the controller is further configured to search for the second service network via the wireless transceiver in response to receiving the SIP INVITE message.

8. The mobile communication device of claim 1, wherein the controller is further configured to use the second subscriber identity card to make an IMS Mobile-Originated (MO) call via the IPsec tunnel in response to initiating the IMS MO call for the second subscriber identity card.

9. The mobile communication device of claim 1, wherein the controller is further configured to use the second subscriber identity card to establish one or more second radio bearers with the second service network via the wireless transceiver, and use the second subscriber identity card to make an IMS Mobile-Originated (MO) call via the second radio bearers, in response to initiating the IMS MO call for the second subscriber identity card.

10. The mobile communication device of claim 1, wherein the setup of the IPsec tunnel and the registration of the IMS service are performed when the wireless transceiver is unable to detect a coverage of the second service network using the second subscriber identity card.

11. A method for coordinating communication operations associated with a plurality of subscriber identity cards in a mobile communication device with a single wireless transceiver, comprising:
using a first subscriber identity card to establish one or more first radio bearers with a first service network via the single wireless transceiver, wherein when the one or more first radio bearers are established between the mobile communication device and the first service network, the mobile communication device is allowed to transmit one or more data packets to the first service network;
using a second subscriber identity card to set up an Internet Protocol Security (IPsec) tunnel with a non-3GPP access gateway of the second service network via the first radio bearers; and
using the second subscriber identity card to register an IP Multimedia Subsystem (IMS) service with the second service network via the IPsec tunnel.

12. The mobile communication device of claim 11, wherein the non-3GPP access gateway includes an evolved Packet Data Gateway (ePDG).

13. The method of claim 11, further comprising:
receiving, via the first radio bearers, a Session Initiation Protocol (SIP) INVITE message indicating an IMS Mobile-Terminated (MT) call for the second subscriber identity card.

14. The method of claim 13, further comprising:
receiving the IMS MT call for the second subscriber identity card via the first radio bearers in response to receiving the SIP INVITE message.

15. The method of claim 13, further comprising:
generating a notification of the IMS MT call for a user of the mobile communication device and reject the IMS MT call, in response to receiving the SIP INVITE message.

16. The method of claim 13, further comprising:
in response to receiving the SIP INVITE message,
using the second subscriber identity card to establish one or more second radio bearers with the second service network via the single wireless transceiver; and
receiving the IMS MT call for the second subscriber identity card via the second radio bearers.

17. The method of claim 13, further comprising:
searching for the second service network via the single wireless transceiver in response to receiving the SIP INVITE message.

18. The method of claim 11, further comprising:
using the second subscriber identity card to make an IMS Mobile-Originated (MO) call via the first radio bearers in response to initiating the IMS MO call for the second subscriber identity card.

19. The method of claim 11, further comprising:
in response to initiating an IMS Mobile-Originated (MO) call for the second subscriber identity card,
using the second subscriber identity card to establish one or more second radio bearers with the second service network via the single wireless transceiver; and
using the second subscriber identity card to make the IMS MO call via the second radio bearers.

20. The method of claim 11, wherein the registration with the non-3GPP access gateway of the second service network using the second subscriber identity card is performed when the single wireless transceiver is unable to detect a coverage of the second service network.

* * * * *